US011714998B2

(12) United States Patent
Abuhatzera et al.

(10) Patent No.: US 11,714,998 B2
(45) Date of Patent: Aug. 1, 2023

(54) ACCELERATING NEURAL NETWORKS WITH LOW PRECISION-BASED MULTIPLICATION AND EXPLOITING SPARSITY IN HIGHER ORDER BITS

(71) Applicant: Intel Corporation, Santa Clara, CA (US)

(72) Inventors: Avishaii Abuhatzera, Amir (IL); Om Ji Omer, Bangalore (IN); Ritwika Chowdhury, Bengaluru (IN); Lance Hacking, Spanish Fork, UT (US)

(73) Assignee: INTEL CORPORATION, Santa Clara, CA (US)

( * ) Notice: Subject to any disclaimer, the term of this patent is extended or adjusted under 35 U.S.C. 154(b) by 265 days.

(21) Appl. No.: 16/909,295

(22) Filed: Jun. 23, 2020

(65) Prior Publication Data

US 2020/0320375 A1 Oct. 8, 2020

(30) Foreign Application Priority Data

May 5, 2020 (IN) .............................. 202041019060

(51) Int. Cl.
*G06N 3/063* (2023.01)
*G06N 3/08* (2023.01)
(Continued)

(52) U.S. Cl.
CPC ........... *G06N 3/063* (2013.01); *G06N 3/0454* (2013.01); *G06N 3/088* (2013.01)

(58) Field of Classification Search
None
See application file for complete search history.

(56) References Cited

U.S. PATENT DOCUMENTS

2019/0340510 A1\* 11/2019 Li ........................... G06N 3/082
2020/0210759 A1\* 7/2020 Chou ....................... G06T 1/20
(Continued)

FOREIGN PATENT DOCUMENTS

WO 2018057749 A1 3/2018

OTHER PUBLICATIONS

EP Patent Application No. 20209738.2-1231, "Extended European Search Report" dated Jun. 1, 2021. 10 pages.
(Continued)

*Primary Examiner* — Harry S Hong
(74) *Attorney, Agent, or Firm* — Jaffery Watson Mendonsa & Hamilton LLP

(57) ABSTRACT

An apparatus to facilitate accelerating neural networks with low precision-based multiplication and exploiting sparsity in higher order bits is disclosed. The apparatus includes a processor comprising a re-encoder to re-encode a first input number of signed input numbers represented in a first precision format as part of a machine learning model, the first input number re-encoded into two signed input numbers of a second precision format, wherein the first precision format is a higher precision format than the second precision format. The processor further includes a multiply-add circuit to perform operations in the first precision format using the two signed input numbers of the second precision format; and a sparsity hardware circuit to reduce computing on zero values at the multiply-add circuit, wherein the processor to execute the machine learning model using the re-encoder, the multiply-add circuit, and the sparsity hardware circuit.

25 Claims, 8 Drawing Sheets

(51) Int. Cl.
*G06N 3/04* (2023.01)
*G06N 3/088* (2023.01)

(56) References Cited

U.S. PATENT DOCUMENTS

| | | | |
|---|---|---|---|
| 2020/0228137 A1* | 7/2020 | Chinya | G06N 3/063 |
| 2020/0342294 A1* | 10/2020 | Jang | G06N 3/04 |
| 2021/0019115 A1* | 1/2021 | Venkatesh | G06F 7/5334 |
| 2021/0256357 A1* | 8/2021 | Najafi | G06F 7/5443 |

OTHER PUBLICATIONS

Kim, Minkyu et al: "Deep Convolutional Neural Network Accelerator Featuring Conditional Computing and Low External Memory Access", 2020 IEEE Custom Integrated Circuits Conference (CICC), IEEE, Mar. 22, 2020 (Mar. 22, 2020), pp. 1-4, XP033762136. (Year: 2020).

Moshovos, A. et al: "Exploiting Typical Values to Accelerate Deep Learning", Computer, IEEE Computer Society, USA, vol. 51, No. 5, May 2018 (May 2018), pp. 18-30, XP011684003. (Year: 2018).

Song, Mingcong et al: "Prediction Based Execution on Deep Neural Networks", 2018 ACM/IEEE 45th Annual International Symposium on Computer Architecture (ISCA), IEEE, Jun. 2018 (Jun. 2018), pp. 752-763, XP033375534. (Year: 2018).

Venkatesh, Ganesh et al: "Accelerating Deep Convolutional Networks Using Low-Precision and Sparsity", 2017 IEEE International Conference on Acoustics, Speech and Signal Processing (ICASSP), IEEE, Mar. 5, 2017 (Mar. 5, 2017) pp. 2861-2865, XP033258936. (Year: 2017).

\* cited by examiner

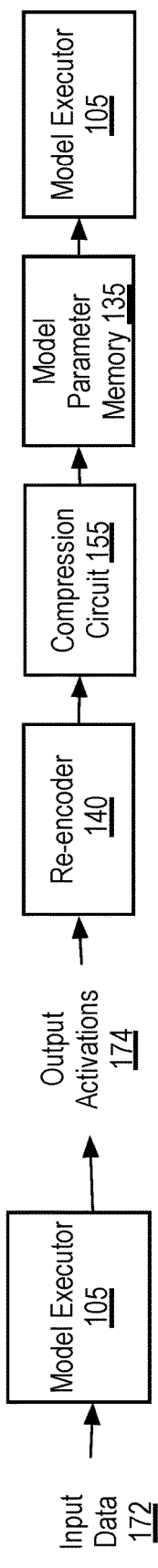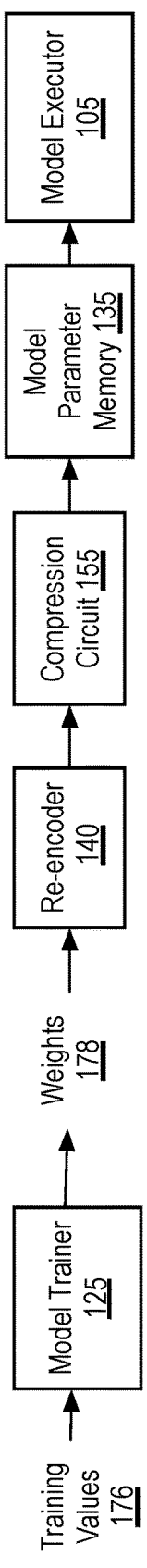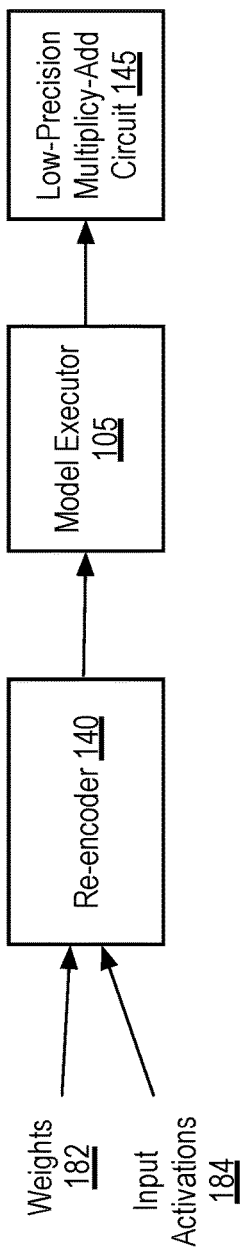
FIG. 1B

500

---

Receive a first signed weighting value of a plurality of signed weighting values represented in a first precision format, the plurality of signed weighting values associated with a machine learning model
510

▼

Re-encode the first signed weighting value into two signed weighting numbers of a second precision format, where the first precision format is a higher precision format than the second precision format
520

▼

Perform multiply-add operations in the first precision format using the two signed weight numbers of the second precision format
530

▼

Reduce computing on zero values during the multiply-add operations based on a predicted sparsity of the plurality of signed weighting values
540

```
┌─────────────────────────────────────────────────────────────────────────────┐
│ Receive a first activation value of a plurality of activation values in a first precision format │
│                                                                         610 │
└─────────────────────────────────────────────────────────────────────────────┘
                                        │
                                        ▼
┌─────────────────────────────────────────────────────────────────────────────┐
│ Re-encode the first activation value into two activation numbers of a second precision format, where │
│       the first precision format is a higher precision than the second precision format          │
│                                                                         620 │
└─────────────────────────────────────────────────────────────────────────────┘
                                        │
                                        ▼
┌─────────────────────────────────────────────────────────────────────────────┐
│ Perform multiply-add operations in the first precision format using two signed weight numbers of the │
│     second precision format and the two activation numbers of the second precision format        │
│                                                                         630 │
└─────────────────────────────────────────────────────────────────────────────┘
                                        │
                                        ▼
┌─────────────────────────────────────────────────────────────────────────────┐
│ Reduce computing on zero value during the multiply-add operations based on a predicted sparsity of a │
│           plurality of signed weighting values and the plurality of signed weighting values         │
│                                                                         640 │
└─────────────────────────────────────────────────────────────────────────────┘
```

FIG. 6

ACCELERATING NEURAL NETWORKS WITH LOW PRECISION-BASED MULTIPLICATION AND EXPLOITING SPARSITY IN HIGHER ORDER BITS

CROSS-REFERENCE

The present application is related to and, under 35 U.S.C. 119, claims the benefit of and priority to Indian Patent Application 202041019060 entitled ACCELERATING NEURAL NETWORKS WITH LOW PRECISION-BASED MULTIPLICATION AND EXPLOITING SPARSITY IN HIGHER ORDER BITS, by Avishaii Abuhatzera, et al., filed May 5, 2020, the contents of which are incorporated herein by reference.

FIELD

This disclosure relates generally to machine learning and more particularly to accelerating neural networks with low precision-based multiplication and exploiting sparsity in higher order bits.

BACKGROUND OF THE DISCLOSURE

Neural networks and other types of machine learning models are useful tools that have demonstrated their value solving complex problems regarding pattern recognition, natural language processing, automatic speech recognition, etc. Neural networks operate using artificial neurons arranged into one or more layers that process data from an input layer to an output layer, applying weighting values to the data during the processing of the data. Such weighting values are determined during a training process and applied during an inference process.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate typical embodiments and are therefore not to be considered limiting of its scope. The figures are not to scale. In general, the same reference numbers will be used throughout the drawing(s) and accompanying written description to refer to the same or like parts.

FIG. 1B illustrates example flows of apply a re-encoder to accelerate neural networks with low precision-based multiplication and exploit sparsity in higher order bits in compressed and uncompressed data modes, according to implementations of the disclosure.

FIG. 5 is a flow diagram illustrating an embodiment of a method for accelerating neural networks with low precision-based multiplication and exploiting sparsity in higher order bits using weighting values.

FIG. 6 is a flow diagram illustrating another embodiment of a method for accelerating neural networks with low precision-based multiplication and exploiting sparsity in higher order bits using activation values.

DETAILED DESCRIPTION

Figure 1A:
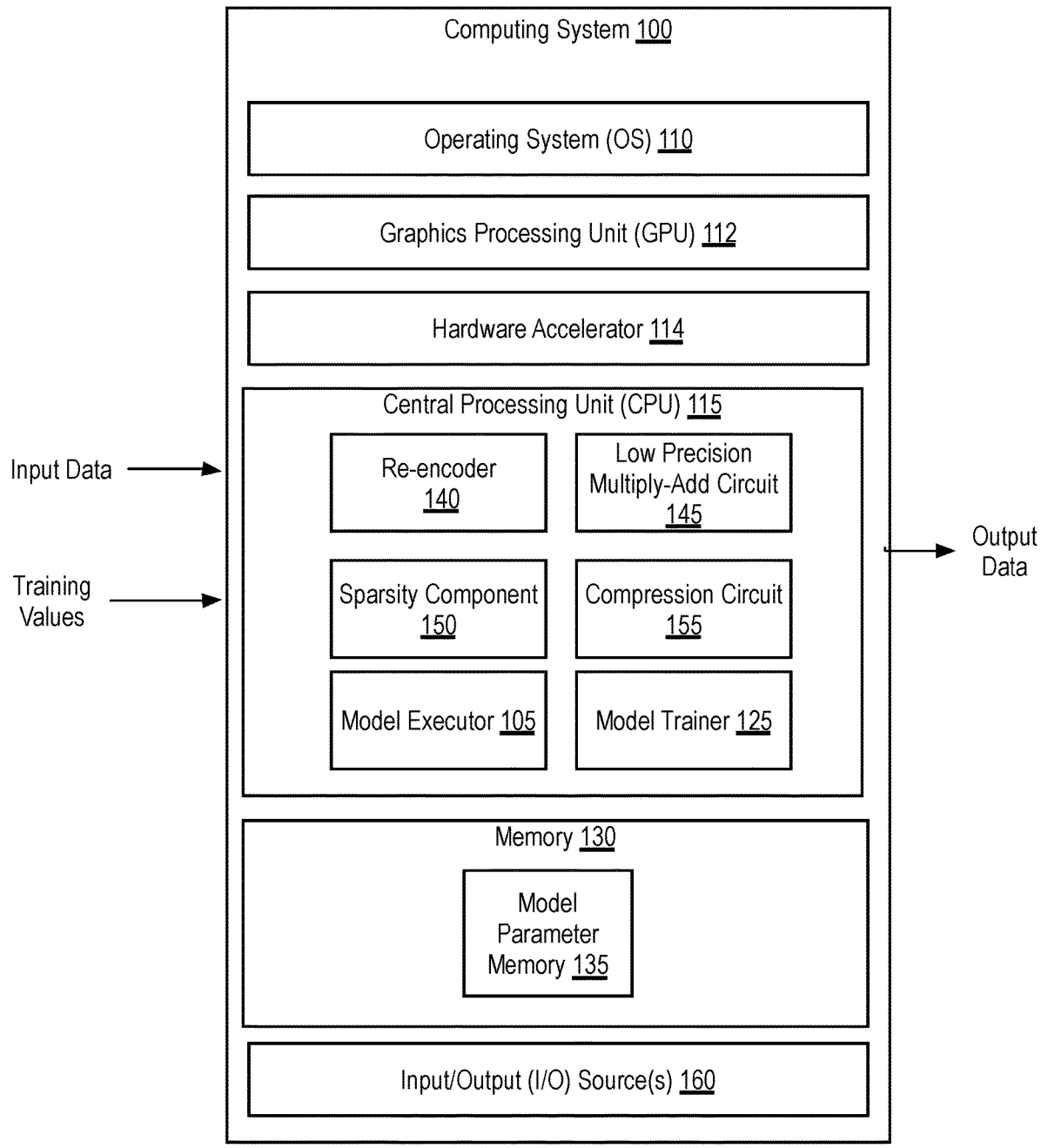
FIG. 1A is a block diagram of an example computing system that may be used to accelerate neural networks with low precision-based multiplication and exploit sparsity in higher order bits, according to implementations of the disclosure.

Implementations of the disclosure describe accelerating neural networks with low precision-based multiplication and exploiting sparsity in higher order bits. In computer engineering, computing architecture is a set of rules and methods that describe the functionality, organization, and implementation of computer systems. Today's computing systems are expected to deliver near zero-wait responsiveness and superb performance while taking on large workloads for execution. Therefore, computing architectures have continually changed (e.g., improved) to accommodate demanding workloads and increased performance expectations.

Examples of large workloads include neural networks, artificial intelligence (AI), machine learning, etc. Such workloads have become more prevalent as they have been implemented in a number of computing devices, such as personal computing devices, business-related computing devices, etc. Furthermore, with the growing use of large machine learning and neural network workloads, new silicon has been produced that is targeted at running large workloads. Such new silicon includes dedicated hardware accelerators (e.g., graphics processing unit (GPU), field-programmable gate array (FPGA), vision processing unit (VPU), etc.) customized for processing data using data parallelism.

Many different types of machine learning models and/or machine learning architectures exist. One particular type of machine learning model is a neural network. A deep neural network (DNN) is one type of neural network architecture. When training a machine learning model, such as a neural network or DNN, input data is transformed to some output, and a loss or error function is used to compare if the model predicts an output value close to an expected value. The amount of calculated error is then propagated back from the output to the inputs of the model using stochastic gradient descent (or another training algorithm) and the process repeats until the error is acceptably low enough or a maximum number of iterations is achieved. The parameters learned during this training process are the weights that connect each node. In some examples, hundreds, thousands, tens of thousands, etc., of nodes may be involved in the DNN.

In many machine learning models in use today, weights are represented as floating point numbers, sometimes represented by thirty-two bits of data. Storing each weighting value as a thirty-two bit floating point number, while accurate, can incur significant resource overhead in terms of memory space used for storing such weighting values and bandwidth for accessing such weighting values. In some examples, quantization of such weights is possible, and enables the weighting values to be stored using a reduced precision format, without sacrificing accuracy of the machine learning model. For example, weights may be quantized to an 8-bit integer value, without an appreciable loss of accuracy of the model. Such quantization may result in a model that is approximately a quarter the size, as compared to a model that is not quantized.

Furthermore, because the model uses smaller bit-widths (e.g., 8 bit values, as opposed to 16 bit, 32 bit, 64 bit, 128 bit, etc. values), the model may be executed in a more optimized fashion on hardware that supports such lower bit-width capabilities (e.g., a Field Programmable Gate Array (FPGA), a Digital Signal Processor (DSP), etc.). Such hardware typically consumes fewer hardware resources (e.g., power) and, as an added benefit, frees up compute resources of a central processor to perform other tasks. Thus, it is possible to achieve lower power (and, in some examples, higher throughput) by utilizing these quantized weights. Model size reduction is especially significant for embedded devices that may have slower and/or limited processing resources. Reduction of storage, processing, and energy costs is beneficial on any machine.

Some accelerators (e.g., the VPU) include computation engines to execute neural network workloads. A neural compute engine (NCE), is hardware that is configured to run neural network workloads at high speeds and low power without compromising accuracy. In examples disclosed herein, neural network workloads are topologies represented as compute graphs that include nodes and edges. As used herein, nodes are primitive mathematical operations also referred to as layers, and edges are paths that inter-connect nodes and are represented as multidimensional arrays (e.g., tensors). In some examples, an NCE executes a topology on a per-layer basis such that the NCE executes each layer by performing the mathematical operations represented by the nodes and dataflow operations represented by the edges of that layer. An NCE executes a layer in four steps that run substantially in parallel: 1) reading an input activation tensor, 2) reading a parameter tensor. 3) executing a layer operation (e.g., performing convolution, fully connected, etc.), and 4) writing an output activation tensor. In some examples, the reading and writing steps are referred to herein as memory cycles and the executing steps are referred to herein as computation cycles.

Therefore, the NCE performs computation cycles and memory cycles during the execution of a layer. As used herein, performance is the speed at which the NCE executes the layer in a neural network workload. For example, the performance of the NCE is measured based on how the computing architecture of the NCE leverages the computing cycles versus the memory cycles. Current challenges in deploying the large workloads of neural networks and machine learning models, for example, include reducing data movement and increasing compute density while executing these workloads.

Some conventional techniques to reduce data movement and increase compute density include training and quantizing using lower precision data types, hardware sparsity support, lossless compression, and aggressive clock gating. With respect to training and quantizing using lower precision data types, during training a weight parameter using a floating point number represented as 32 bits (FP32) may be represented as a lower precision floating point 16 bit number (FP16), bfloat 16 bit values may be represented as bfloat 8 bits values, and so on. Lower precision values in training have been proven to be generally effective but have two disadvantages. One disadvantage is that the approach uses some degree of re-training to avoid accuracy loss, which is expensive and, in some cases, not an option. Furthermore, the second disadvantage is that the approach is lossy, resulting in reduced accuracy, especially below 8 bit.

With respect to hardware sparsity support, this approach can reduce and/or eliminate moving and computing on values that are zero, especially with pruning of low energy weights to increase the occurrences of such values. Sparsity, as discussed herein, may refer to the presence of mostly zeros in a vector or matrix. However, hardware for this approach can be complex and does not help when computing on non-zero values, which are common in neural networks without special treatment (pruning). The machine learning model may further utilize special treatment (pruning) of the neural network model to remove the zero values in weights, and retraining to re-gain the lost accuracy due to pruning. Without special treatment, however, the benefits of this approach are limited to activations. Activations mostly see values that are zero with rectified linear unit (RELU) function, but less often with other activation functions.

With respect to lossless compression, data compression techniques, such as Huffman, are effective at reducing dynamic random access memory (DRAM) bandwidth. However, the size of the circuits used to implement these techniques makes it difficult to keep the compression level consistent throughout the compute block.

With respect to aggressive clock gating, this approach can be applied to minimize toggle rates when a dynamic range of operand values are low. Such clock gating techniques can help in power savings, but do not alleviate throughput of the machine.

Example approaches disclosed herein accelerate neural networks by using low precision-based multiplication and by exploiting sparsity in higher order bits. Specifically, example approaches disclosed herein convert the weights and activations of a neural network topology for inference (e.g., INT8 or INT16-based neural network) to be mathematically-equivalent represented in a lower precision format. For example, the weight and activations may be mathematically-equivalent represented by 4 bit (4b) integers (also referred to as "nibbles") and perform multiplications using 4-bit multipliers. As noted above, sparsity may refer to the presence of mostly zeros in a vector or matrix. In DNN models, activation and weight parameters are mostly centered around zero. As such, there is a higher probability of a higher order part (i.e., most significant bits (MSBs)) of these parameters to be zero. This inherent "sparsity" in MSBs provides an opportunity for improving DNN performance by reducing (e.g., eliminating) computing on zero in implementations of the disclosure. Because a higher order 4-bit nibble is likely to have zero values, reducing (e.g., eliminating) computing on such zero values can provide compute savings and thus improve speed.

Example approaches described herein also provide improvements to compressed storage. As higher order 4-bit nibbles are likely to have zero values, these higher order nibbles do not have to be stored in memory. Instead, in implementations of the disclosure, a one-bit mask could be stored in the memory to indicate if a higher order 4-bit nibble is zero or not. If the one-bit mask is non-zero, then the corresponding value is stored in the memory with an additional 4 bits. In scenarios where higher order 4-bit nibbles are mostly zero, this can result in lower storage size and also reduce data-movement between the memory and the compute-engine.

Implementations of the disclosure further utilize a quantization of weights (e.g., INT7 quantization) to enable the nibble-based computations, where the underlying hardware further includes signed 4-bit multipliers. Implementations of the disclosure may also be expanded to convert weights and activations for INT16-based neural networks to be mathematically-equivalent represented by 8-bit integers and perform multiplication using 8-bit multipliers by applying similar methodologies, and so on for increasing integer-based representations of neural network topology weights and activations.

Implementations of the disclosure utilize the statistical occurrence of weights and activations in neural networks being most likely centered around zero. In the example use case of the ResNet-50 convolutional neural network (CNN), the res2b branch2b layer of ResNet-50 has 50.6% of its weights with values lying between −16 to +15. This indicates that, even after pruning, many of the values have their 3 bit MSBs as zero. Furthermore, the intermediate layer activations (HWC) in ResNet-50 are also quite sparse, with 55% to 80% of the activations having their 3 MSBs as zero. Therefore, there is a higher probability of higher order bits (MSBs) of weights and activations in the neural network to be either zero (for positive numbers) or −1 (for negative numbers).

This inherent sparsity in MSBs provides an opportunity to improve neural network performance. Implementations of the disclosure aim to minimize the impractical zero computations, thus reducing the compute time. Implementations of the disclosure can provide the technological advantage of speeding up execution of a neural network during inference, as well as improving data storage savings for weights and/or activation parameters of the neural network.

FIG. 1A is a block diagram of an example computing system that may be used to accelerate neural networks with low precision-based multiplication and exploit sparsity in higher order bits, according to implementations of the disclosure. The example computing system 100 may be implemented as a component of another system such as, for example, a mobile device, a wearable device, a laptop computer, a tablet, a desktop computer, a server, etc. In one embodiment, computing system 100 includes or can be integrated within (without limitation): a server-based gaming platform; a game console, including a game and media console; a mobile gaming console, a handheld game console, or an online game console. In some embodiments the computing system 100 is part of a mobile phone, smart phone, tablet computing device or mobile Internet-connected device such as a laptop with low internal storage capacity. In some embodiments the computing system 100 is part of an Internet-of-Things (IoT) device, which are typically resource-constrained devices. IoT devices may include embedded systems, wireless sensor networks, control systems, automation (including home and building automation), and other devices and appliances (such as lighting fixtures, thermostats, home security systems and cameras, and other home appliances) that support one or more common ecosystems, and can be controlled via devices associated with that ecosystem, such as smartphones and smart speakers.

Computing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the computing system 100 includes or is part of a television or set top box device. In one embodiment, computing system 100 can include, couple with, or be integrated within a self-driving vehicle such as a bus, tractor trailer, car, motor or electric power cycle, plane or glider (or any combination thereof). The self-driving vehicle may use computing system 100 to process the environment sensed around the vehicle.

As illustrated, in one embodiment, computing device 100 may include any number and type of hardware and/or software components, such as (without limitation) graphics processing unit ("GPU" or simply "graphics processor") 112, a hardware accelerator 114, central processing unit ("CPU" or simply "application processor") 115, memory 130, network devices, drivers, or the like, as well as input/output (I/O) sources 160, such as touchscreens, touch panels, touch pads, virtual or regular keyboards, virtual or regular mice, ports, connectors, etc. Computing device 100 may include operating system (OS) 110 serving as an interface between hardware and/or physical resources of the computer device 100 and a user. In some implementations, the computing system 100 may include a combination of one or more of the CPU 115, GPU 112, and/or hardware accelerator 114 on a single system on a chip (SoC), or may be without a GPU 112 or visual output (e.g., hardware accelerator 114) in some cases, etc.

As used herein, "hardware accelerator", such as hardware accelerator 114, refers to a hardware device structured to provide for efficient processing. In particular, a hardware accelerator may be utilized to provide for offloading of certain processing tasks from a central processing unit (CPU) or other general processor, wherein the hardware accelerator may be intended to provide more efficient processing of the processing tasks than software run on the CPU or other processor. A hardware accelerator may include, but is not limited to, a graphics processing unit (GPU), a vision processing unit (VPU), neural processing unit, AI (Artificial Intelligence) processor, field programmable gate array (FPGA), or application-specific integrated circuit (ASIC).

The GPU 112 (or graphics processor 112), hardware accelerator 114, and/or CPU 115 (or application processor 115) of example computing system 100 may include a model executor 105 and a model trainer 125. Although the model executor 105 and model trainer 125 are depicted as part of the CPU 115, in some implementations, the GPU 112 and/or hardware accelerator 114 may also include the model executor 105 and/or the model trainer 125.

The example model executor 105 accesses input values (e.g., via an input interface (not shown)), and processes those input values based on a machine learning model stored in a model parameter memory 135 of the memory 130 to produce output values (e.g., via an output interface (not shown)). The input data may be received from one or more data sources (e.g., via one or more sensors, via a network interface, etc.). However, the input data may be received in any fashion such as, for example, from an external device (e.g., via a wired and/or wireless communication channel). In some examples, multiple different types of inputs may be received.

In the illustrated example of FIG. 1A, the example neural network parameters stored in the model parameter memory 135 are trained by the neural network trainer 125 such that input training data (e.g., received via a training value interface (not shown)) results in output values based on the training data. In the illustrated example of FIG. 1A, the model executor 105 utilizes a re-encoder 140, a low precision multiply-add circuit 145, a sparsity component 150, and a compression circuit 155 when processing the model during training and/or inference.

In some examples, the input data and/or output data is received via inputs and/or outputs of the system of which the computing system 100 is a component.

The example model executor 105, the example model trainer 125, the example re-encoder 140, the example low precision multiply-add circuit 145, the example sparsity component 150, and the example compression circuit 155 are implemented by one or more logic circuits such as, for example, hardware processors. In some examples, one or more of the example model executor 105, the example model trainer 125, the example re-encoder 140, the example low precision multiply-add circuit 145, the sparsity component 150, or the compression circuit 155 may be implemented by a same hardware component (e.g., a same logic circuit) or by different hardware components (e.g., different logic circuits, different computing systems, etc.). However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In some implementations, the sparsity component 150 may also be referred to as a sparsity hardware circuit.

In examples disclosed herein, the example model executor 105 executes a machine learning model. The example machine learning model may be implemented using a neural network (e.g., a feedforward neural network). However, any other past, present, and/or future machine learning topology (ies) and/or architecture(s) may additionally or alternatively be used such as, for example, a CNN.

To execute a model, the example model executor 105 accesses input data. The example model executor 105 (using the example low precision multiply-add circuit 145, the sparsity component 150, and/or the compression circuit 155) applies the model (defined by the model parameters (e.g., neural network parameters including weight and/or activations) stored in the model parameter memory 135) to the input data. In some examples, the model executor 105 utilizes the example re-encoder 140 to re-encode the model parameters (e.g., weight and/or activations). For example, the re-encoder 140 may re-encode a signed higher precision format number into two signed lower precision format numbers (e.g., re-encode a signed 8 bit integer into two signed 4 bit numbers). Implementations of the disclosure may utilize a combination or sub-combination of re-encoder 140, sparsity component 150, and/or compression circuit 155 to provide for compressed data modes or uncompressed data modes when accelerating neural networks using low precision-based multiplication and exploited sparsity in higher order bits, as described in further detail below with respect to FIG. 1B.

FIG. 1B illustrates example flows 170, 175, 180 of applying re-encoder 140 to accelerate neural networks with low precision-based multiplication and exploit sparsity in higher order bits in compressed data modes and/or uncompressed data modes, according to implementations of the disclosure. In one embodiment, similarly numbered components from FIG. 1A are also depicted in FIG. 1B. In one embodiment, example flows 170 and 175 depict compressed data modes implemented by components of computing system 100 described with respect to FIG. 1A. Example flow 180 depicts an uncompressed data mode implemented by components of computing system 100 described with respect to FIG. 1A. Implementations of the disclosure are not limited to the example flows 170, 175, 180 described with respect to FIG. 1B, and other example flows and arrangement of components may be utilized in implementations of the disclosure.

In one embodiment, a first mode is depicted in flow 170 which depicts a compressed data mode for "on-the-fly" (e.g., during execution of a machine learning model) data compression for output activations (e.g., feature maps). In flow 170, the re-encoder 140 and compression circuit 155 are applied while writing output activations 174 to model parameter memory 135. The re-encoder 140 and compression circuit 155 may re-encode and compress the output activations 174 using techniques of implementations of the disclosure that are described in further detail below. The output activations 174 are generated by model executor 105 as part of processing input data 172 with a trained model. The re-encoded and compressed output activations may then be utilized by model executor 105 for further execution of the machine learning model. For this first mode depicted in flow 170, embodiments can achieve compressed data-storage and lower data-movement.

Similarly, a second mode illustrated in flow 175 depicts a compressed data mode that is an offline mode for re-encoding and compressing weights prior to loading (e.g., storing) the weights (of a machine learning model) to model parameter memory 135. The weight values 182 can be re-encoded by re-encoder 140 in an offline mode and subsequently compressed by compression circuit 155 before loading to model parameter memory 135 in order to achieve lower memory footprint. The compressed weights may then be subsequently provided to model executor 105 for execution of the machine learning model.

In one embodiment, a third mode is illustrated in flow 180 which depicts an uncompressed data mode that is applied to input activations and/or weights before being provided to low-precision multiply-add circuitry. For the third mode depicted in flow 180, weights 182 and/or input activations 184 are provided in uncompressed form (e.g., weights 182 and/or input activations 184 were stored in model parameter memory 135 in an uncompressed form) to re-encoder 140 for re-encoding. The re-encoded weights and/or input activations may then be utilized by model executor 105 and can be directly be fed to the low-precision multiply-add circuitry 145 for further execution of machine learning model in implementations of the disclosure.

Referring back to FIG. 1A, in one embodiment, the model executor 105 may use the low precision multiply-add circuit 145 to perform multiplication using 4 bit multipliers and the re-encoded neural network parameters. With input from the sparsity component 150 and/or the compression circuit 155, the low precision multiply-add circuit 145 can reduce and/or eliminate computation on zero values of the lower precision multipliers. For example, with respect to the first mode described in flow 170 and the second mode described in flow 175 of FIG. 1B, where the re-encoder 140 re-encodes output activations and/or weights before loading to model parameter memory 135, the re-encoder 140 can be applied on an output write path to achieve data compression and reduce data movement.

In some implementations, a combination of the sparsity component 150 and/or the compression circuit 155 may detect sparsity involved in multiply-accumulate operations and/or apply conditional masked-based block-compression techniques for data storage and movement savings if an expected or actual sparsity satisfies (e.g., is above) a threshold. The model executor 105 provides the result as output data via, for example, an output interface (not shown) for further use.

In one implementation, sparsity component 150 can, based on sparsity bits in the input data to the re-encoder 140, control functioning of the low precision multiply-add circuit 145. The sparsity component 150 may be applied to both compressed data modes (e.g., flows 170, 175 described with respect to FIG. 1B) and uncompressed data modes (e.g., flow 180 described with respect to FIG. 1B) implemented by computing system 100. In one implementation, compression circuit 155 applies compression techniques to output activations and/or weights. The compression circuit 155 may be applied to the compressed data modes (e.g., flows 170, 175 described with respect to FIG. 1B) implemented by computing system 100.

The example model parameter memory 135 of the illustrated example of FIG. 1A is implemented by any memory, storage device and/or storage disc for storing data such as, for example, flash memory, magnetic media, optical media, etc. Furthermore, the data stored in the example model parameter memory 135 may be in any data format such as, for example, binary data, comma delimited data, tab delimited data, structured query language (SQL) structures, etc. While in the illustrated example the model parameter memory 135 is illustrated as a single element, the model parameter memory 135 and/or any other data storage elements described herein may be implemented by any number and/or type(s) of memories. In the illustrated example of FIG. 1A, the example model parameter memory 135 stores model weighting parameters that are used by the model executor 105 to process inputs for generation of one or more outputs as output data.

In examples disclosed herein, the output data may be information that classifies the received input data (e.g., as determined by the model executor 105.). However, any other type of output that may be used for any other purpose may additionally or alternatively be used. In examples disclosed herein, the output data may be output by an input/output (I/O) source 160 that displays the output values. However, in some examples, the output data may be provided as output values to another system (e.g., another circuit, an external system, a program executed by the computing system 100, etc.). In some examples, the output data may be stored in a memory.

The example model trainer 125 of the illustrated example of FIG. 1A compares expected outputs (e.g., received as training values at the computing system 100) to outputs produced by the example model executor 105 to determine an amount of training error, and updates the model parameters (e.g., model parameter memory 135) based on the amount of error. After a training iteration, the amount of error is evaluated by the model trainer 125 to determine whether to continue training. In examples disclosed herein, errors are identified when the input data does not result in an expected output. That is, error is represented as a number of incorrect outputs given inputs with expected outputs. However, any other approach to representing error may additionally or alternatively be used such as, for example, a percentage of input data points that resulted in an error.

The example model trainer 125 determines whether the training error is less than a training error threshold. If the training error is less than the training error threshold, then the model has been trained such that it results in a sufficiently low amount of error, and no further training is pursued. In examples disclosed herein, the training error threshold is ten errors. However, any other threshold may additionally or alternatively be used. Moreover, other types of factors may be considered when determining whether model training is complete. For example, an amount of training iterations performed and/or an amount of time elapsed during the training process may be considered.

The training data that is utilized by the model trainer 125 includes example inputs (corresponding to the input data expected to be received), as well as expected output data. In examples disclosed herein, the example training data is provided to the model trainer 125 to enable the model trainer 125 to determine an amount of training error.

In examples disclosed herein, the example model executor 105 accelerates neural networks by using low precision-based multiplication and by exploiting sparsity in higher order bits. As discussed above, to execute a model, such as a machine learning model utilizing a neural network, the example model executor 105 applies a machine learning model using a combination of the re-encoder 140, low precision multiply-add circuit 145, sparsity component 150, and compression circuit 155. Further discussion and detailed description of the model executor 105, re-encoder 140, low precision multiply-add circuit 145, sparsity component 150, and compression circuit 155 is provided below with respect to FIGS. 2 and 3.

The example I/O source 160 of the illustrated example of FIG. 1A enables communication of the model stored in the model parameter memory 135 with other computing systems. In some implementations, the I/O source(s) 160 may include, at but is not limited to, a network device, a microprocessor, a camera, a robotic eye, a speaker, a sensor, a display screen, a media player, a mouse, a touch-sensitive device, and so on. In this manner, a central computing system (e.g., a server computer system) can perform training of the model and distribute the model to edge devices for utilization (e.g., for performing inference operations using the model). In examples disclosed herein, the I/O source 160 is implemented using an Ethernet network communicator. However, any other past, present, and/or future type(s) of communication technologies may additionally or alternatively be used to communicate a model to a separate computing system.

While an example manner of implementing the computer system 100 is illustrated in FIG. 1A, one or more of the elements, processes and/or devices illustrated in FIG. 1A may be combined, divided, re-arranged, omitted, eliminated and/or implemented in any other way. Further, the example model executor 105, the example model trainer 125, the example re-encoder 140, the example low precision multiply-add circuit 145, the example sparsity component 150, the example compression circuit 155, the I/O source(s) 160, and/or, more generally, the example computing system 100 of FIG. 1A may be implemented by hardware, software, firmware and/or any combination of hardware, software and/or firmware. Thus, for example, any the example model executor 105, the example model trainer 125, the example re-encoder 140, the example low precision multiply-add circuit 145, the example sparsity component 150, the example compression circuit 155, the example I/O source(s) 160, and/or, more generally, the example computing system 100 of FIG. 1A could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In some implementations of the disclosure, a software and/or firmware implementation of at least one of the example model executor 105, the example model trainer 125, the example re-encoder 140, the example sparsity component 150, the example compression circuit 155, the example I/O source(s) 160, and/or, more generally, the example computing system 100 of FIG. 1A be provided. Such implementations can include a non-transitory computer readable storage device or storage disk such as a memory, a digital versatile disk (DVD), a compact disk (CD), a Blu-ray disk, etc. including the software and/or firmware. Further still, the example computing system 100 of FIG. 1A may include one or more elements, processes and/or devices in addition to, or instead of, those illustrated in FIG. 1A, and/or may include more than one of any or all of the illustrated elements, processes, and devices. As used herein, the phrase "in communication," including variations thereof, encompasses direct communication and/or indirect communication through one or more intermediary components, and does not utilize direct physical (e.g., wired) communication and/or constant communication, but rather additionally includes selective communication at periodic intervals, scheduled intervals, aperiodic intervals, and/or one-time events.

Figure 2:
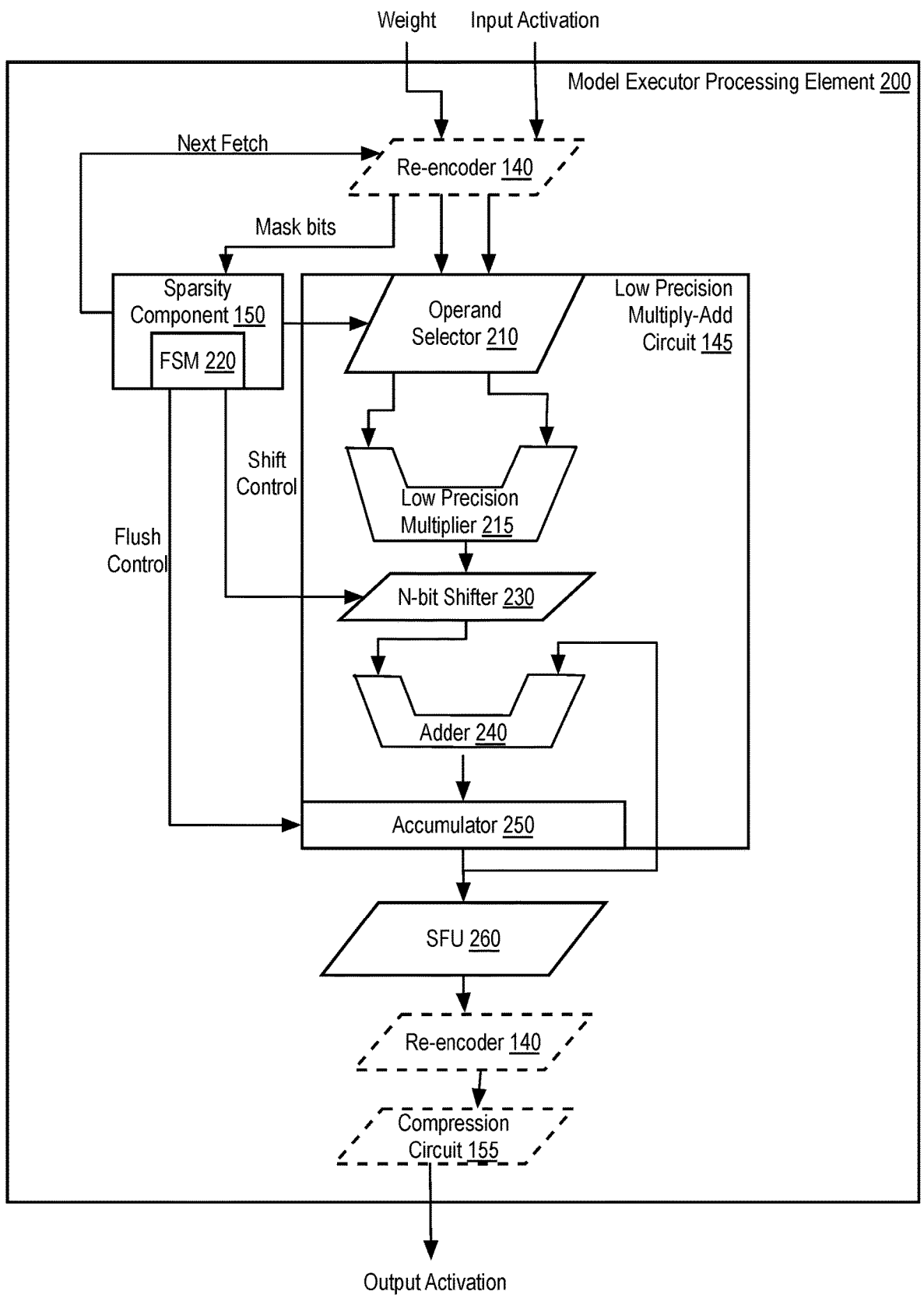
FIG. 2 depicts an example model executor processing element to accelerate neural networks by using low precision-based multiplication and by exploiting sparsity in higher order bits, according to implementations of the disclosure.

FIG. 2 depicts an example model executor processing element 200 to accelerate neural networks by using low precision-based multiplication and by exploiting sparsity in higher order bits, according to implementations of the disclosure. In one implementation, the model executor processing element 200 is the same as model executor 105 described with respect to FIG. 1A. Model executor processing element 200 is further illustrated to include the re-encoder 140, low precision multiply-add circuit 145, sparsity component 150, and compression circuit 155, described with respect to FIG. 1A. The example model executor processing element 200 of FIG. 2 may include one or more elements, processes and/or devices in addition to, or instead of, those illustrated in FIG. 2, and/or may include more than one of any or all of the illustrated elements, processes, and devices.

In one implementation, the model executor processing element 200 may receive one or more parameters including a weight and/or an input activation as part of an inference stage of a machine learning model implemented via one or more layers of a neural network. The parameters may be provided to the re-encoder 140. In one example, as weight values generally are signed values, a 7-bit precision signed number can be utilized and re-encoded as two 4-bit signed numbers. The 7-bit precision format may be utilized for weights in a neural network as well as for intermediate activation values.

Figure 3:
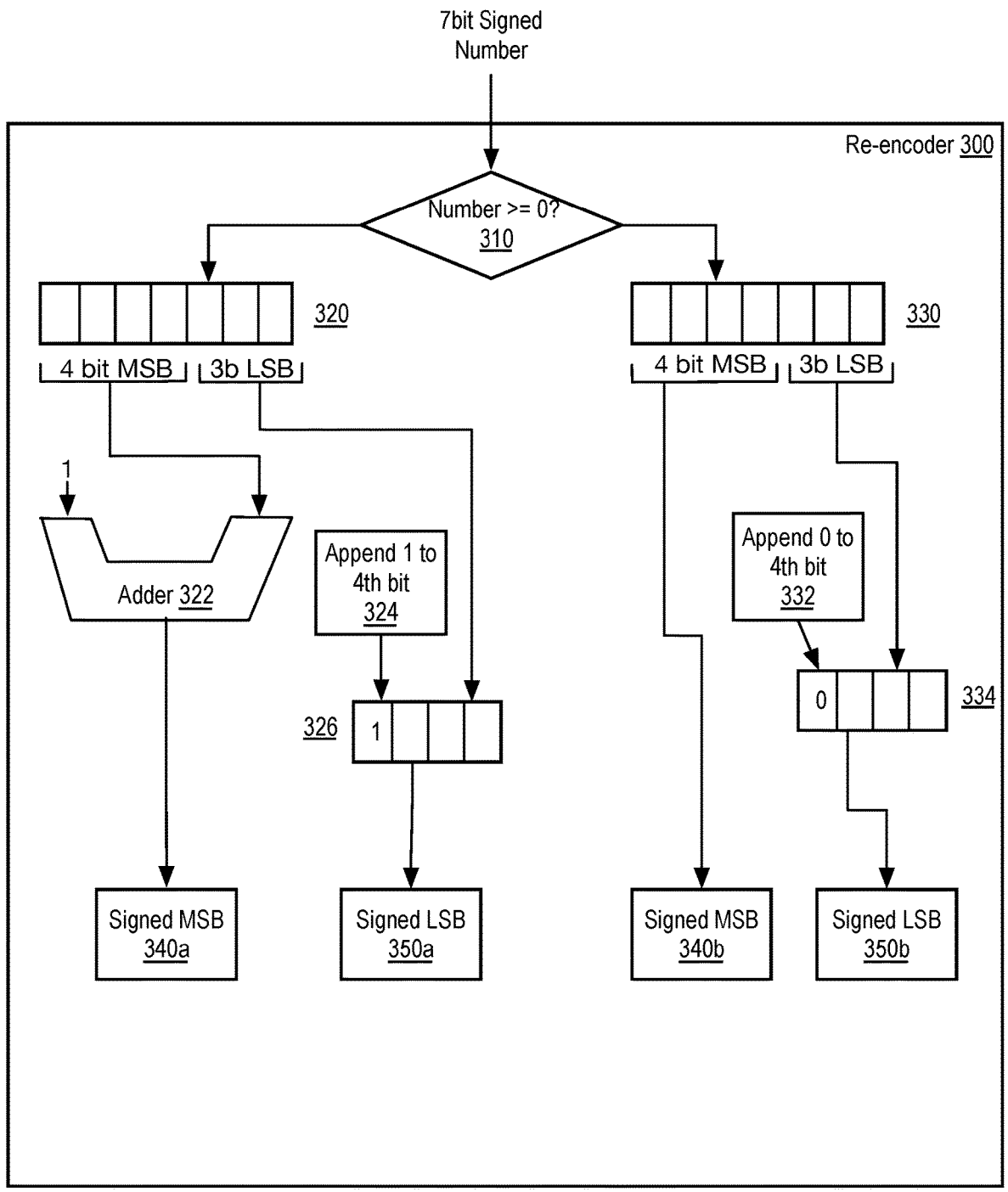
FIG. 3 depicts an example re-encoder to re-encode a signed higher precision format number into two signed lower precision format numbers, according to implementations of the disclosure.

FIG. 3 depicts an example re-encoder 300 to re-encode a signed higher precision format number into two signed lower precision format numbers, according to implementations of the disclosure. The re-encoder 300 of FIG. 3 may be the same as re-encoder 140 described with respect to FIGS. 1 and 2. Although re-encoder 300 is described with respect to FIG. 3 as re-encoding a signed higher precision format number into two signed lower precision format numbers, re-encoder 300 may also be configured for utilization on unsigned values as well. Implementations of the disclosure are not limited to re-encoding of signed integers. Unsigned integers may also be re-encoded in some implementations of the disclosure.

With respect to FIG. 3, re-encoder 300 may include logic and/or circuitry to, for example, re-encode a 7-bit signed number (or in some cases, an 8 bit unsigned number) into two 4-bit numbers (mathematically equivalent). In some implementations, signed 2's complement integers can be re-encoded into two halves, where the expected data range results in a higher likelihood that one of the halves is zero and, as such, is not computed on in implementations of the disclosure. Other larger integer datatypes, for example 16 or 32 bits, may also be re-encoded (e.g., to half their native datasize) by re-encoder 300 in implementations of the disclosure. As such, implementations of the disclosure are not limited to 8-bit integer data types, as discussed herein.

Referring to FIG. 3, the re-encoder may receive, for example, a 7-bit signed integer number that may be a weigh or an activation in a neural network. As noted above, other datatypes may also be operated on by implementations of the disclosure and are not limited to a 7-bit signed integer implementation. However, for purposes of discussion and illustration, FIG. 3 refers to input a of a 7-bit signed integer as a weight and/or activation input. The 7-bit signed number input may be passed to sign determination circuitry 310 that determines whether the number is positive or negative. For example, the sign bit of the number (e.g., the MSB of the 8-bit integer) may be examined to determine if it is a 1 or a 0. In other implementations, if the input integer is an 8-bit signed 2's complement integer, determination circuitry 310 may utilize other lookup mechanisms to determine whether the input integer is positive or negative.

In one example implementation, if the number is negative (e.g., <=0; sign bit is equal to 1, etc.), then the magnitude bits of the 7-bit signed number are re-encoded 320 into a 4-bit MSB and 3-bit least significant bit (LSB) (where the highest MSB, e.g., the sign bit, is not included). The 4-bit MSB is passed to an adder 322, which adds a value of 1 to the 4-bit MSB. The result of the adder 322 is assigned as the signed MSB 340a. The 3-bit LSB is appended 324 a '1' as the 4th bit. The resulting 4-bit LSB 326 is assigned as the signed LSB 350a.

On the other hand, if the 7-bit signed number is positive (e.g., >=0; sign bit is equal to 0, etc.), then the magnitude bits of the 7-bit signed number are re-encoded 330 into a 4-bit MSB and 3-bit LSB (where the highest MSB, e.g., the sign bit, is not included). The 4-bit MSB is assigned as the signed MSB 340b. The 3-bit LSB is appended 332 a '0' as the 4th bit. The resulting 4-bit LSB 334 is assigned as the signed LSB 350b.

In some implementations, re-encoder 300 may re-encode the input integer using other techniques than those described above. For example, the re-encoder 300 may re-encode the input integer into traditional 2's complement halves (e.g., a half of the input integer data is zero from [0, 15]). In one implementation, re-encoding into a 2's complement format may be selected when resulting unsigned data is chosen. In other examples, the re-encoder 300 may re-encode the input integer into the format discussed above (e.g., a half of the input integer data is zero from [−8, 8]). In some implementations, a mixture of 2's compliment re-encodings (e.g., for activations) and the format discussed above encodings (e.g., for weights) may be utilized.

The approach of appending '1' as the 4th bit to the 3-bit LSB of negative signed numbers and appending '0' as the 4th bit to the 3-bit LSB of positive numbers as detailed above, is supported according to the mathematical equivalence shown below.

$$Val\ (7\ \text{bit signed positive number}) = \qquad (1)$$
$$\sum_{i=0}^{6} a(i)2^i \quad [a(i) = \{0, 1\} \text{ for all } i] = \sum_{i=3}^{6} a(i)2^i +$$
$$\sum_{i=0}^{2} a(i)2^i = \left[\sum_{i=0}^{3} (a(i+3)2^i)\right] << 3 + \left[\sum_{i=0}^{3} (b(i)2^i)\right]$$

-continued

Where $b(i) = a(i)$ if $i < 3$ else 0

Val (7 bit signed negative number) = (2)

$$\sum_{i=0}^{3} a(i+3)2^i \times 2^3 + 2^3 + \sum_{i=0}^{2} a(i)2^i -$$
$$2^3 = [\sum_{i=0}^{3} (a(i+3)2^i + 1)] << 3 + [\sum_{i=0}^{3} (c(i)2^i]$$

Where $c(i) = a(i)$ if $i < 3$ else 1

In scenarios where the 4 MSBs are 1111 with the first bit being a sign bit, the first nibble overflows on addition of 1, making the 4 MSBs all zeroes. For example, if the 7b binary number is 1111001 and two signed multipliers are utilized, the 7b binary number can be represented by 2 signed nibbles-0000 (4b: MSB) and 1001(4b: LSB). Redundant MAC operations involving the first nibble may then be avoided using implementations of the disclosure that detect and prevent computations on sparsity.

The following Table 1 illustrates an example range of signed input integers and resulting output MSBs 340a, 340b and LSBs 350a, 350b from the re-encoder 300.

TABLE 1

Re-encoder 300 Inputs and Outputs

| Signed # | Original data: 2 s comp, 8 bit Range: [−128, 127] A Nibble == 0: [0, 15] | Example Input to re-encoder 300: 2 s comp, 7 bit Range: [−64, 63] A Nibble == 0: [0, 8] | Example Output from re-encoder 300: 7b 2 s -> 2xnibble dynamic OR 8b (2xnibble) static Range: [−64, 63] A Nibble == 0: [−8, 8] |
|---|---|---|---|
| 127 | 0111_1111 | Can't represent >63 | Can't represent >63 |
| ... | ... | ... | ... |
| 64 | 0100_0000 | Can't represent >63 | Can't represent >63 |
| 63 | 0011_1111 | 0111_111 | 0_111, 0_111 |
| ... | ... | ... | ... |
| 15 | 0000_1111 | 0001_111 | 0_001, 0_111 |
| 14 | 0000_1110 | 0001_110 | 0_001, 0_110 |
| 13 | 0000_1101 | 0001_101 | 0_001, 0_101 |
| 12 | 0000_1100 | 0001_100 | 0_001, 0_100 |
| 11 | 0000_1011 | 0001_011 | 0_001, 0_011 |
| 10 | 0000_1010 | 0001_010 | 0_001, 0_010 |
| 9 | 0000_1001 | 0001_001 | 0_001, 0_001 |
| 8 | 0000_1000 | 0001_000 | 0_001, 0_000 |
| 7 | 0000_0111 | 0000_111 | 0_000, 0_111 |
| 6 | 0000_0110 | 0000_110 | 0_000, 0_110 |
| 5 | 0000_0101 | 0000_101 | 0_000, 0_101 |
| 4 | 0000_0100 | 0000_100 | 0_000, 0_100 |
| 3 | 0000_0011 | 0000_011 | 0_000, 0_011 |
| 2 | 0000_0010 | 0000_010 | 0_000, 0_010 |
| 1 | 0000_0001 | 0000_001 | 0_000, 0_001 |
| 0 | 0000_0000 | 0000_000 | 0_000, 0_000 |
| −0 | Can't represent | Can't represent | Can't represent |
| −1 | 1111_1111 | 1111_111 | 0_000, 1_111 |
| −2 | 1111_1110 | 1111_110 | 0_000, 1_110 |
| −3 | 1111_1101 | 1111_101 | 0_000, 1_101 |
| −4 | 1111_1100 | 1111_100 | 0_000, 1_100 |
| −5 | 1111_1011 | 1111_011 | 0_000, 1_011 |
| −6 | 1111_1010 | 1111_010 | 0_000, 1_010 |
| −7 | 1111_1001 | 1111_001 | 0_000, 1_001 |
| −8 | 1111_1000 | 1111_000 | 0_000, 1_000 |
| −9 | 1111_0111 | 1110_111 | 1_111, 1_111 |
| −10 | 1111_0110 | 1110_110 | 1_111, 1_110 |
| −11 | 1111_0101 | 1110_101 | 1_111, 1_101 |
| −12 | 1111_0100 | 1110_100 | 1_111, 1_100 |
| −13 | 1111_0011 | 1110_011 | 1_111, 1_011 |
| −14 | 1111_0010 | 1110_010 | 1_111, 1_010 |
| −15 | 1111_0001 | 1110_001 | 1_111, 1_001 |
| ... | ... | ... | ... |
| −63 | 1100_0001 | 1000_001 | 1_001, 1_001 |
| −64 | 1100_0000 | 1000_000 | 1_001, 1_000 |
| ... | ... | ... | ... |
| −127 | 1000_0001 | Can't represent <−64 | Can't represent <−64 |
| −128 | 1000_0000 | Can't represent <−64 | Can't represent <−64 |

Referring back to FIG. 2, the two signed numbers (e.g., signed MSB 340a or 340b, and signed LSB 350a or 350b) generated by re-encoder 140 (e.g., re-encoder 300 of FIG. 3) are passed as input operands for multiplier circuitry of the model executor processing element 200. A combination of one or more of sparsity component 150, low precision multiply-add circuit 145 (including, but not limited to, operand selector 210, low precision multiplier 215, N-bit shifter 230, adder 240, accumulator 250), compression circuit 155, and SFU 260 may be implemented to apply a machine learning model (defined by the model parameters stored in the model parameter memory) to the re-encoded input data using. For example, a combination of the above components and/or circuitry may perform multiplication using low precision (e.g., 4 bit) multipliers to implement at least one of the compressed data modes or uncompressed data modes described with respect to FIG. 1B to facilitate accelerating neural networks using low precision-based multiplication and exploited sparsity in higher order bits. Although the components of FIG. 2 are depicted in a particular arrangement, implementations of the disclosure can modify the arrangement of the components to provide the different compressed and uncompressed data modes described with respect to FIG. 1B.

For example, to enable storage and data-transfer savings, such as when re-encoder circuitry is applied to output activations (e.g., flow 170 described with respect to FIG. 1B), model executor processing element 200 provides a masked-based compression technique to store weights and intermediate activation. In this case, the re-encoder circuitry (such as re-encoder 140 of FIG. 1A) and/or compression circuit 155 can be applied at the output of special functions unit (SFU) 260, as shown in FIG. 2 with re-encoder 140 and/or compression circuit 155 at the output of SFU 260 with a dashed outline.

In one implementation, a 1-bit sparsity mask can be created for each 8-bit integer and N such sparsity masks are grouped for N integers followed by values of integers. A 4-bit MSB (e.g., 340a, 350a) for an integer is skipped by the model executor processing element 200 if corresponding sparse mask bit is set to zero (indicated 4-bit MSB is zero), thus achieving compression. For example, the sparsity component 150 may receive the mask bits and instruct operand selector 210 to skip a 4-bit MSB if the mask bit is set to zero. In some implementations, this operation of sparsity component 150 can apply to both compressed data modes and uncompressed data modes described with respect to FIG. 1B.

In one implementation, when data (e.g., activations and/or weights) is stored in a compressed form (e.g., compressed data modes of flows 170, 175 from FIG. 1B) in memory, a compression ratio (CR) for weights and/or activation data could be computed as below given the probability of a 4-bit MSB being zero to be 'p':

$$\frac{1}{CR} = \frac{2-p}{p} + 0.125 + \frac{1}{2N}$$

In accordance with the above equation, the CR is greater than 1 when p is greater than 0.25. As such, weights or activation may be compressed in response to the expected sparsity being more than 25% per layer basis. For example, the mode that stores data in a compressed form (e.g., flow 170, 175 from FIG. 1B) is selected when p is greater than 0.25. For inference, a sparsity of weights can be computed offline. When input data (weights or input activation) is not stored in compressed form, sparsity can be computed on-the-fly during data fetch. Otherwise, sparsity can be computed at output write circuitry while writing compressed output activation values (e.g., after RELU/pooling operation at SFU 260) at compression circuit 155.

In one implementation, a finite state machine (FSM) 220 of the sparsity component 150 can determine a number of clock stages to perform 8 bit multiplications as well as control: (1) input operand selections to the operand selector 210, (2) a value of 'n' in shift logic, and (3) flush control. The FSM 220 may receive sparsity bits for each weight and input activation operand from the re-encoder 140. In one embodiment, for the mode the stores data in a compressed form (e.g., flow 170 from FIG. 1B), the sparsity bits are read/fetched directly from the memory. In one example embodiment, given $S_W$ and $S_A$ as sparsity bits (i.e., where 0 indicates the 4-bit MSB being zero) for weights and input activation respectively, the outputs of FSM 220 may be computed as follows:

Number of clock stages=$(S_W \hat{} S_A) + 3 \times (S_W \& S_A) + 1$ (3)

Operand selector 210 may include two multiplexers, one each for weights and input activations, with 1-bit select control (value 0 indicates 4-bit LSB to be chosen for multiplier and otherwise 4-bit MSB is selected). In one example, if it is assumed that SelW and SelA are bit select control bits, SelW and SelA can be computed as follows:

$$(Sel_A, Sel_w) = \begin{cases} (0, 0) & \text{for clock stage 0} \\ (S_A, !S_A) & \text{for clock stage 1} \\ (1, S_A) & \text{for clock stage 2} \\ (1, 0) & \text{for clock stage 3} \end{cases} \quad (4)$$

In one implementation, $S_A$ and $S_W$ can be swapped. The description herein provides one example use case, but implementations may be expanded to switch the $S_A$ and $S_W$. A clock stage counter (not shown) can reset to zero upon reaching the determined number of clock stages (e.g., from equation 1 detailed above).

The example low precision multiply-add circuit 145 of the illustrated example of FIG. 2 performs multiplication using low precision (e.g., 4 bit) multipliers as provided by operand selector 210. Low precision multiply-add circuit 145 may also perform multiplication that accounts for detected sparsity in the low precision multipliers, as supported by the sparsity component 150 and FSM 220 detailed above.

In some implementations, execution of the 4-bit MSB may be gated if the 4-bit MSB is zero, saving power. This can applicable in the compressed and uncompressed data modes described in FIG. 1B. For example, this can be applicable to flow 180 where data is stored in the memory in uncompressed form (e.g., using re-encoder circuitry before feeding to 145), and to flows 170, 175 where data is stored in compressed form (utilizing re-encoder circuitry at the output of 260). In some implementations, execution slots of the zero halves may be compressed out, saving power and performance. For byte alignment reasons, this can be a multiple of 8.

The N-bit shifter 230 may apply appropriate shifts to the output of the low precision multiplier 215 as part of the multiply-accumulate operations performed by model executor processing element 200. The shifts may be based on operand type (e.g., 8 bit unsigned or 7 bit signed). In implementations of the disclosure, the value of the 'n' in the n-bit shift operation of N-bit shifter 230 may vary (e.g., takes value from {0, 3, 4, 6, 7, 8}) based on a particular case scenario and clock stage. The various case scenarios are discussed further below.

A first case scenario occurs when both the weights and activations are signed values. In this first case, signed 4 bit multipliers are used. Equation 5 below details the accumulation at the accumulator 250 of low precision multiplier 215 outputs shifted by the n-bit shifter 230 according to the clock stage during this first case. In the example below T0, T1, T2 and T3 represent the computation occurring at difference clock stages (as per the table 2) at the output interface of low-precision multiply-add circuit 215.

ValA(INT7)*ValW(INT7)=T0+(T1<<3)+(T2<<3)+
    (T4<<6) (5)

where T0=ValA(4b:LSB)×ValW(4b:LSB),
T1=ValA(4b:MSB)×ValW(4b:LSB)),
T2=ValA(4b:LSB)×ValW(4b:MSB)), and
T3=ValA(4b MSB)×ValW(4b:MSB))

As per definition of T1, T2, in equation 5 above, T1 and T2 may not have to represent computations at clock-stage 1 and clock-stage 2. These bindings can depend on sparsity bits ($S_A$, $S_W$), as per the Table 2 below:

TABLE 2

| | Clock stage bindings | | | |
|---|---|---|---|---|
| Clock-Stage | $S_A = 1$ $S_W = 1$ | $S_A = 0$ $S_W = 1$ | $S_A = 1$ $S_W = 0$ | $S_A = 0$ $S_W = 0$ |
| 0 | T0 | T0 | T0 | T0 |
| 1 | T1 | T2 | T1 | — |
| 2 | T2 | — | — | — |
| 3 | T3 | — | — | — |

A second case scenario occurs when one of either the weights or activations are signed. In this second case, one signed and one unsigned input are used. In one example, assume that the weights are signed and the activations are unsigned. This second case may occur when RELU is used as the activation function in the network, for example. With reference to such an example, equation 6 below details the accumulation at the accumulator 250 of low precision multiplier 215 outputs shifted by the n-bit shifter 230 according to the clock stage during this second case.

ValA(INT8)*ValW(INT7)=T0+(T1<<4)+
    (T2<<3)+(T4<<7) (6)

where T0=ValA(4b:LSB)*ValW(4b:LSB),

T1=ValA(4b:MSB)*ValW(4b:LSB)),
T2=ValA(4b:LSB)*ValW(4b:MSB)), and
T3=ValA(4b MSB)*ValW(4b:MSB))

A third case scenario occurs when both the weights and activations are unsigned. In this third case, both 4-bit multipliers are unsigned. In this example, equation 7 below details the accumulation at the accumulator 250 of low precision multiplier 215 outputs shifted by the n-bit shifter 230 according to the clock stage during this third case.

$$ValA(INT\ 8)*ValW(INT8)=T0+T1<<4+T2<<4+T3<<8. \quad (7)$$

where T0=ValA(4b:LSB)*ValW(4b:LSB),
T1=ValA(4b:MSB)*ValW(4b:LSB),
T2=ValA(4b:LSB)*ValW(4b:MSB), and
T3=ValA(4b MSB)*ValW(4b:MSB)

In some implementations, the clock stage bindings depicted with respect to Table 2 are similarly applicable to the second and third case scenarios described above.

In some implementations, for hardware that natively supports 4-bits, further optimizations may be made to a compiler to support accelerating neural networks with low precision-based multiplication and exploiting sparsity in higher order bits. In one implementation, the 8-bit×8-bit kernels can be implemented as a graph split. Such a graph split of the kernel can enable better load balancing between the branches of the kernel (due to different probability of 4-bit zeros). Furthermore, such a graph split can enable a higher probability for block-based sparsity that can be implemented with relatively low hardware overhead in the GPU and the CPU.

In one implementation, Table 3 (depicted as Tables 3-1, 3-2, 3-3, and 3-4) below provides an example execution flow for low-precision multiply-add circuit 145 (as described in FIGS. 1 and 2). The execution flow shown in Table 3 logically flows from Table 3-1 to Table 3-2 to Table 3-3 to Table 3-4. Table 3 provides one example execution flow and implementations of the disclosure are not limited to such a flow.

TABLE 3-1

Low-Precision Multiply-Add Circuit Example Execution Flow

| Clock ticks | Next Fetch (i.e., data accessed from memory 135) | Fetch(7 bit) (i.e., input to re-encoder 300) | Split (i.e., output from re-encoder 300) |
|---|---|---|---|
| 0 | 0000_0001 (A); 1111_1000 (W) | | |
| 1 | 1111_1110 (A); 1111_0111 (W) | 0000_001; 1111_000 | |
| 2 | | 1111_110; 1110_111 | 0000, 0001; 0000, 1000 |
| 3 | 0000_1001 (A); 1111_1110 (W) | | 0000, 1110; 1111, 1111 |
| 4 | | 0001_001; 1111_110 | |
| 5 | 1111_0110 (A); 1111_0101 (W) | | 0001, 0001; 0000, 1110 |
| 6 | | 1110_110; 1110_101 | |
| 7 | | | 1111, 1110; 1111, 1101 |
| 8 | | | |
| 9 | 0000_1001 (A); 1111_1110 (W) | | |
| 10 | | 0001_001; 1111_110 | |
| 11 | | | 0001, 0001; 0000, 1110 |

TABLE 3-1-continued

Low-Precision Multiply-Add Circuit Example Execution Flow

| Clock ticks | Next Fetch (i.e., data accessed from memory 135) | Fetch(7 bit) (i.e., input to re-encoder 300) | Split (i.e., output from re-encoder 300) |
|---|---|---|---|
| 12 | | | |
| 13 | | | |
| 14 | | | |
| 15 | | | |
| 16 | | | |
| 17 | | | |

TABLE 3-2

Low-Precision Multiply-Add Circuit Example Execution Flow (continued)

| Clock ticks | Sparsity bits(Sa, Sw) | Select Control bits (Sela, Selw) | Operand Select | 4-bit multiplier |
|---|---|---|---|---|
| 0 | | | | |
| 1 | | | | |
| 2 | | | | |
| 3 | (0, 0) | (0, 0) for clock stage 0 | 0001, 1000 | |
| 4 | (0, 1) | (0, 0) for clock stage 0 | 1110, 1111 | 1111_1000 |
| 5 | | (0, 1) for clock stage 1 | 1110, 1111 | 0000_0010 |
| 6 | (1, 0) | (0, 0) for clock stage 0 | 0001, 1110 | 0000_0010 |
| 7 | | (1, 0) for clock stage 1 | 0001, 1110 | 1111_1110 |
| 8 | (1, 1) | (0, 0) for clock stage 0 | 1110, 1101 | 1111_1110 |
| 9 | | (1, 0) for clock stage 1 | 1111, 1101 | 0000_0110 |
| 10 | | (1, 1) for clock stage 2 | 1111, 1111 | 0000_0011 |
| 11 | | (0, 1) for clock stage 3 | 1111, 1110 | 0000_0001 |
| 12 | (1, 0) | (0, 0) for clock stage 0 | 0001, 1110 | 0000_0010 |
| 13 | | (1, 0) for clock stage 1 | 0001, 1110 | 1111_1110 |
| 14 | | | | 1111_1110 |
| 15 | | | | |
| 16 | | | | |
| 17 | | | | |

TABLE 3-3

Low-Precision Multiply-Add Circuit Example Execution Flow (continued)

| Clock ticks | Shift control | Nbit Shift | Adder |
|---|---|---|---|
| 0 | | | |
| 1 | | | |
| 2 | | | |
| 3 | | | |
| 4 | | | |
| 5 | 0 | 1111_1000 | |
| 6 | 0 | 0000_0010 | 1111_1111_1111_1000 |
| 7 | 3 | 0001_0000 | 1111_1111_1111_1010 |
| 8 | 0 | 1111_1110 | 0000_0000_0000_1010 |
| 9 | 3 | 1111_0000 | 0000_0000_0000_1000 |
| 10 | 0 | 0000_0110 | 1111_1111_1111_1000 |
| 11 | 3 | 0001_1000 | 1111_1111_1111_1110 |
| 12 | 6 | 0100_0000 | 0000_0000_0001_0110 |
| 13 | 3 | 0001_0000 | 0000_0000_0101_0110 |
| 14 | 0 | 1111_1110 | 0000_0000_0110_0110 |
| 15 | 3 | 1111_0000 | 0000_0000_0110_0100 |
| 16 | | | 0000_0000_0101_0100 |
| 17 | | | 0000_0000_0101_0100 |

TABLE 3-4

Low-Precision Multiply-Add Circuit
Example Execution Flow (continued)

| Clock ticks | Flush Out? | Accumulator | Accumulator Out |
|---|---|---|---|
| 0 | | | |
| 1 | | | |
| 2 | | | |
| 3 | | | |
| 4 | | | |
| 5 | | | |
| 6 | | | |
| 7 | No | 1111_1111_1111_1000 | |
| 8 | No | 1111_1111_1111_1010 | |
| 9 | No | 0000_0000_0000_1010 | |
| 10 | No | 0000_0000_0000_1000 | |
| 11 | No | 1111_1111_1111_1000 | |
| 12 | No | 1111_1111_1111_1110 | |
| 13 | No | 0000_0000_0001_0110 | |
| 14 | No | 0000_0000_0101_0110 | |
| 15 | No | 0000_0000_0110_0110 | |
| 16 | No | 0000_0000_0110_0100 | |
| 17 | Yes | 0000_0000_0000_0000 | 0000_0000_0101_0100 |

Figure 4:
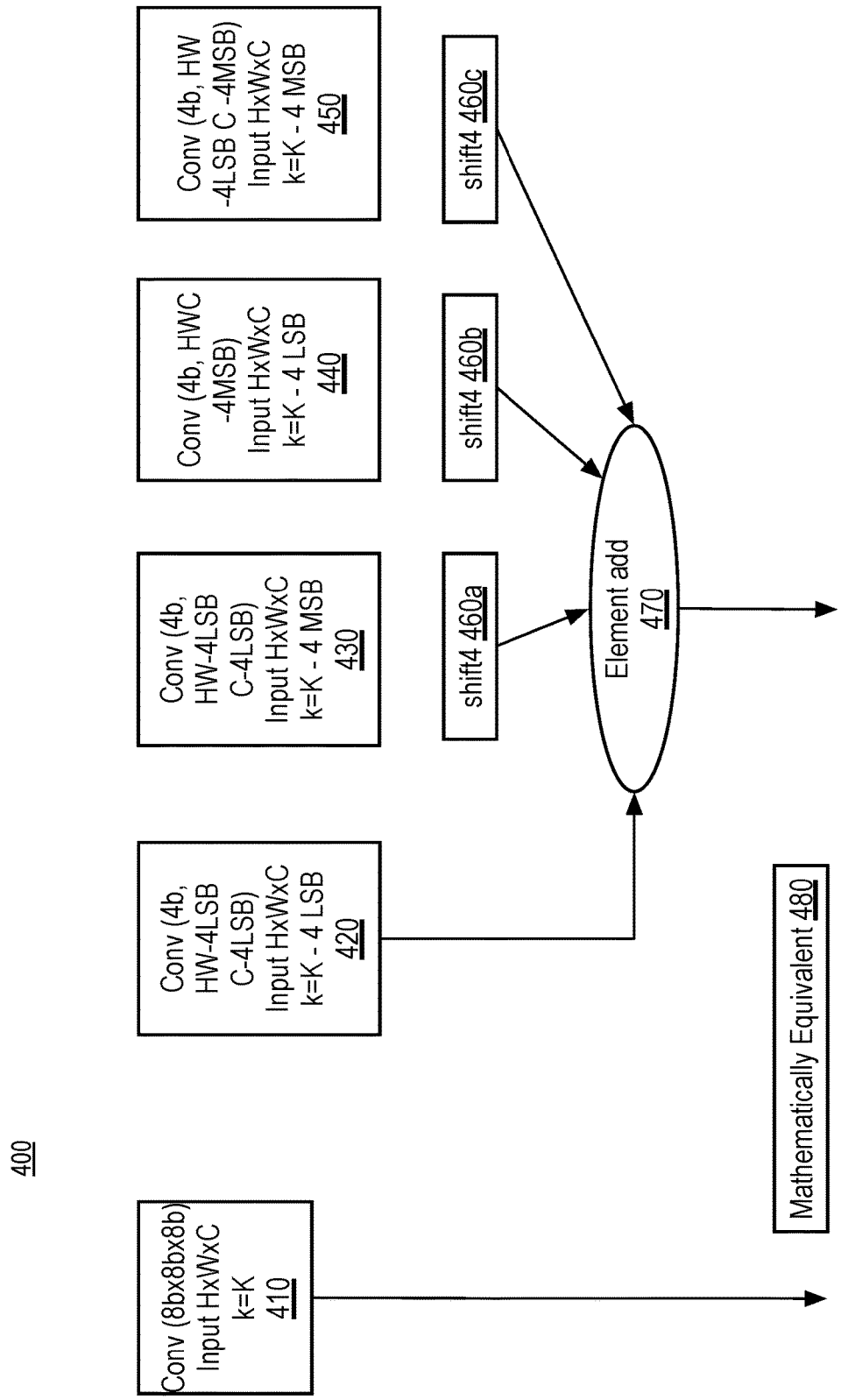
FIG. 4 depicts a graph split of kernels to support accelerating neural networks with low precision-based multiplication and exploiting sparsity in higher order bits, according to implementations of the disclosure.

FIG. 4 depicts a system 400 implementing a graph split of kernels to support accelerating neural networks with low precision-based multiplication and exploiting sparsity in higher order bits, according to implementations of the disclosure. A conventional kernel implementation is shown as block 410. This conventional kernel implementation of block 410 may be implemented as the graph split shown in blocks 420-450, with the inclusion of shift4 logic 460a-c and element add logic 470, to cause a mathematically equivalent result 480 of the graph split kernel implementation as compared to the conventional kernel implementation 410.

FIG. 5 is a flow diagram illustrating an embodiment of a method 500 for accelerating neural networks with low precision-based multiplication and exploiting sparsity in higher order bits using weighting values. Method 500 may be performed by processing logic that may comprise hardware (e.g., circuitry, dedicated logic, programmable logic, etc.), software (such as instructions run on a processing device), or a combination thereof. More particularly, the method 500 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 500 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter. In one implementation, model executor, such as model executor 105 of FIG. 1 or model executor processing element 200 of FIG. 2, may perform method 500.

Method 500 begins at processing block 510 where a first signed weighting value of a plurality of signed weighting values represented in a first precision format is received. In one implementation, the plurality of signed weighting values are associated with a machine learning model. At processing block 520, the first signed weighting value is re-encoded into two signed weighting numbers of a second precision format. In one implementation, the first precision format is a higher precision format than the second precision format. In one implementation, the first precision format is an 8 bit integer format and the second precision format is a 4 bit nibble format.

At processing block 530, multiply-add operations in the first precision format are performed using the two signed weight numbers of the second precision format. Lastly, at processing block 540, computing on zero value is reduced (e.g., eliminated) during the multiply-add operations based on a predicted sparsity of the plurality of signed weighting values.

FIG. 6 is a flow diagram illustrating another embodiment of a method 600 for accelerating neural networks with low precision-based multiplication and exploiting sparsity in higher order bits using activation values. Method 600 may be performed by processing logic that may comprise hardware (e.g., circuitry, dedicated logic, programmable logic, etc.), software (such as instructions run on a processing device), or a combination thereof. More particularly, the method 600 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

The process of method 600 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4 may not be repeated or discussed hereafter. In one implementation, model executor, such as model executor 105 of FIG. 1 or model executor processing element 200 of FIG. 2, may perform method 600.

Method 600 begins at processing block 610 where a first activation value of a plurality of activation values represented in a first precision format is received. In one implementation, the plurality of activation values are associated with a machine learning model. At processing block 620, the first activation value is re-encoded into two activation numbers of a second precision format. In one implementation, the first precision format is a higher precision format than the second precision format. In one implementation, the first precision format is an 8 bit integer format and the second precision format is a 4 bit nibble format.

At processing block 630, multiply-add operations in the first precision format is performed using two signed weight numbers of the second precision format and using the two activation numbers of the second precision format. Lastly, at processing block 640, computing on zero value is reduced (e.g., eliminated) during the multiply-add operations based on a predicted sparsity of a plurality of signed weighting values and the plurality of activation values.

Figure 7:
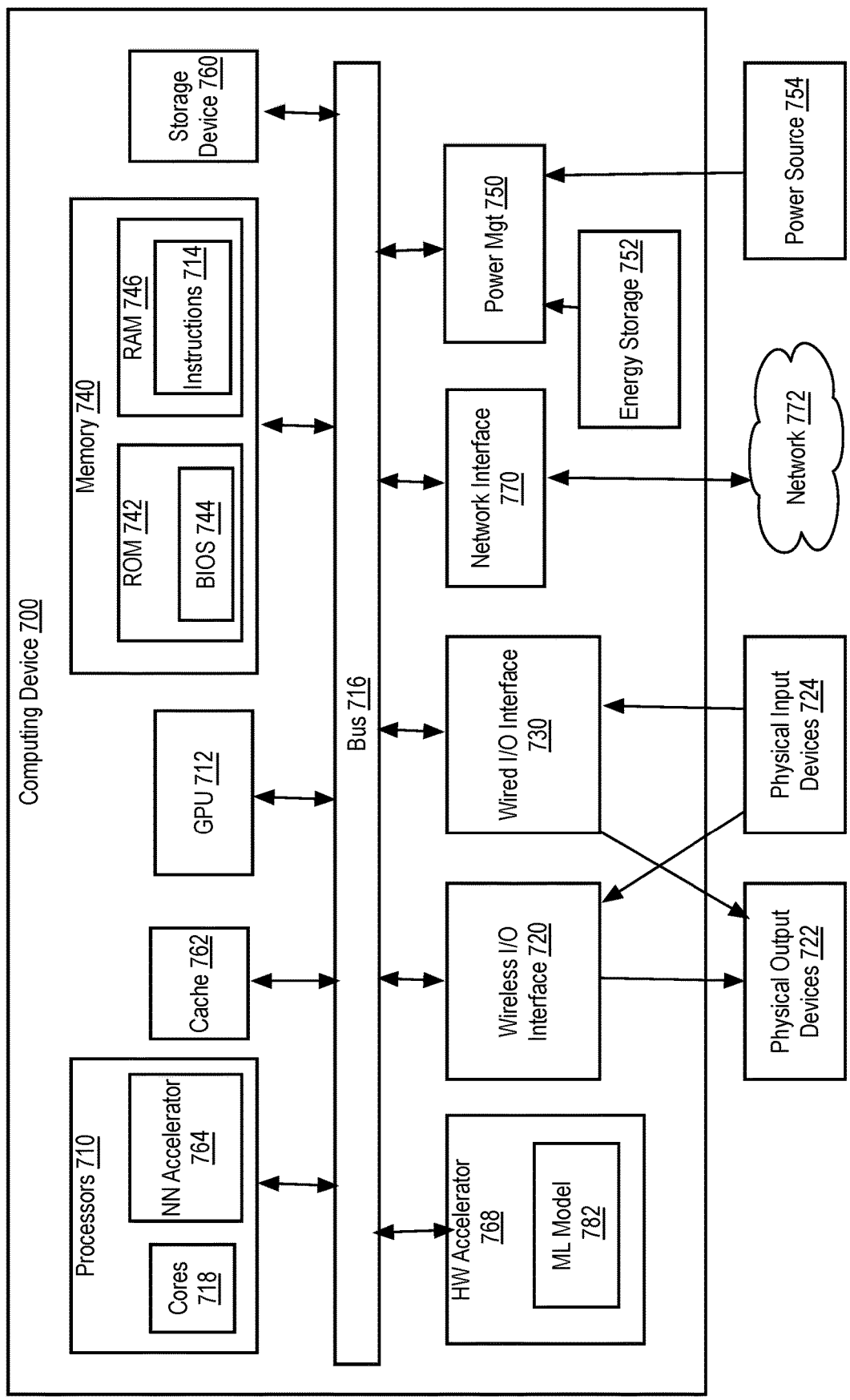
FIG. 7 is a schematic diagram of an illustrative electronic computing device to enable accelerating neural networks with low precision-based multiplication and exploiting sparsity in higher order bits, according to some embodiments.

FIG. 7 is a schematic diagram of an illustrative electronic computing device to enable accelerating neural networks with low precision-based multiplication and exploiting sparsity in higher order bits, according to some embodiments. In some embodiments, the computing device 700 includes one or more processors 710 including one or more processors cores 718 and a neural network accelerator 764, the neural network accelerator 764 to accelerate neural networks with low precision-based multiplication and exploiting sparsity in higher order bits, as provided in FIGS. 1-6. In some embodiments, the computing device 700 includes a hardware accelerator 768, the hardware accelerator including a machine learning model 784. In some embodiments, the computing device is to accelerate neural networks implementing the machine learning model 784 with low precision-based multiplication and exploiting sparsity in higher order bits, as provided in FIGS. 1-6.

The computing device 700 may additionally include one or more of the following: cache 762, a graphical processing unit (GPU) 712 (which may be the hardware accelerator in some implementations), a wireless input/output (I/O) interface 720, a wired I/O interface 730, system memory 740 (e.g., memory circuitry), power management circuitry 750, non-transitory storage device 760, and a network interface 770 for connection to a network 772. The following discussion provides a brief, general description of the components forming the illustrative computing device 700. Example, non-limiting computing devices 700 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. For example, machine-readable instruction sets 714 may include instructions to implement accelerating neural networks with low precision-based multiplication and exploiting sparsity in higher order bits, as provided in FIGS. 1-6.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 700 includes a bus or similar communications link 716 that communicably couples and facilitates the exchange of information and/or data between various system components including the processor cores 718, the cache 762, the graphics processor circuitry 712, one or more wireless I/O interfaces 720, one or more wired I/O interfaces 730, one or more storage devices 760, and/or one or more network interfaces 770. The computing device 700 may be referred to in the singular herein, but this is not intended to limit the embodiments to a single computing device 700, since in some embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 7 are of conventional design. Consequently, such blocks are not be described in further detail herein, as they will be understood by those skilled in the relevant art. The bus 716 that interconnects at least some of the components of the computing device 700 may employ any currently available or future developed serial or parallel bus structures or architectures.

The system memory 740 may include read-only memory ("ROM") 742 and random access memory ("RAM") 746. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include, but are not limited to: universal serial bus (USB), IEEE 1394 ("FireWire"), and similar.

The computing device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The computing device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 7. For example, one or more of the above-described components may be directly coupled to other components, or may be coupled to each other, via one or more intermediary components (not shown). In another example, one or more of the above-described components may be integrated into the processor cores 718 and/or graphics processor circuitry 712. In some embodiments, all or a portion of the bus 716 may be omitted and the components are coupled directly to each other using suitable wired or wireless connections.

Flowcharts representative of example hardware logic, machine readable instructions, hardware implemented state machines, and/or any combination thereof for implementing the system 100 (FIG. 1A), the processing element 200 (FIG. 2), processing element 300 (FIG. 3), system 400 (FIG. 4), the method 500 (FIG. 5), and the method 600 (FIG. 6), already discussed. The machine readable instructions may be one or more executable programs or portion(s) of an executable program for execution by a computer processor, such as the processor 710 shown in the example computing device 700 discussed above in connection with FIG. 7. The program may be embodied in software stored on a non-transitory computer readable storage medium such as a CD-ROM, a floppy disk, a hard drive, a DVD, a Blu-ray disk, or a memory associated with the processor 710, but the entire program and/or parts thereof could alternatively be executed by a device other than the processor 710 and/or embodied in firmware or dedicated hardware. Further, although the example program is described with reference to the flowcharts illustrated in FIGS. 5 and/or 6, many other methods of implementing the example computing system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may utilize one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but utilize addition of a library (e.g., a dynamic link library (DLL)), a software development kit (SDK), an application programming interface (API), etc. in order to execute the instructions on a particular computing device or other device. In another example, the machine readable instructions may be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus to facilitate accelerating neural networks with low precision-based multiplication and exploiting sparsity in higher order bits. The apparatus of Example 1 comprises a processor including a re-encoder to re-encode a first input number of signed input numbers represented in a first precision format as part of a machine learning model, the first input number re-encoded into two signed input numbers of a second precision format, wherein the first precision format is a higher precision format than the second precision format; a multiply-add circuit to perform operations in the first precision format using the two signed input numbers of the second precision format; and a sparsity hardware circuit to reduce computing on zero values at the multiply-add circuit; wherein the processor to execute the machine learning model using the re-encoder, the multiply-add circuit, and the sparsity hardware circuit.

In Example 2, the subject matter of Example 1 can optionally include wherein the signed input numbers comprise at least one of weighting values or activation values of the machine learning model. In Example 3, the subject matter of any one of Examples 1-2 can optionally include wherein the processor further comprises a special functions unit (SFU) to apply an activation function in the machine learning model, and wherein the re-encoder to re-encode output activations of the SFU represented in the first precision format into two numbers of the second precision format. In Example 4, the subject matter of any one of Examples 1-3 can optionally include wherein the processor further comprises a compression circuit to compress the re-encoded output activations.

In Example 5, the subject matter of any one of Examples 1-4 can optionally include wherein the processor further comprises a compression circuit to compress the weighting values represented in the second precision format. In Example 6, the subject matter of any one of Examples 1-5 can optionally include wherein the sparsity hardware circuit comprises a finite state machine (FSM) to determine whether any of the two signed input numbers corresponding to most significant bits (MSB) comprise zero values and to cause the multiply-add circuit to skip the operations on numbers comprising zero values.

In Example 7, the subject matter of any one of Examples 1-6 can optionally include wherein the processor further comprises shift logic to shift outputs of a multiplier of the multiply-add circuit based on a determined clock stage. In Example 8, the subject matter of any one of Examples 1-7 can optionally include wherein the second precision format is half of a datasize of the first precision format. In Example 9, the subject matter of any one of Examples 1-8 can optionally include wherein the second precision format is a four bit nibble format and wherein the first precision format is an eight bit integer format.

In Example 10, the subject matter of any one of Examples 1-9 can optionally include wherein the sparsity hardware circuit operates to reduce computing on zero values at the multiply-add circuit in response to a predicted sparsity of most significant bits of the signed input numbers satisfying a determined threshold. In Example 11, the subject matter of any one of Examples 1-10 can optionally include wherein a compiler that compiles the machine learning model for execution by the processor is to implement a graph split to load balance between branches of a kernel, and wherein the compiler is to implement 8 bit by 8 bit kernels as the graph split.

Example 12 is at least one non-transitory machine readable storage medium for facilitating accelerating neural networks with low precision-based multiplication and exploiting sparsity in higher order bits. The at least one non-transitory machine readable storage medium of Example 12 comprises instructions that, when executed, cause at least one processor to at least: receive a first signed input value of a plurality of signed input numbers represented in a first precision format, the plurality of signed input numbers associated with a machine learning model; and execute the machine learning model by: re-encoding the first signed input number into two signed input numbers of a second precision format, wherein the first precision format is a higher precision format than the second precision format; performing multiply-add operations in the first precision format using the two signed input numbers of the second precision format; and reducing computing on zero values during the multiply-add operations based on a predicted sparsity of the plurality of signed input values.

In Example 13, the subject matter of Example 12 can optionally include wherein the plurality of signed input numbers comprises at least one of weighting values or activation values of the machine learning model. In Example 14, the subject matter of Examples 12-13 can optionally include wherein the instructions, when executed further cause the at least one processor to reduce computing on zero values during the multiply-add operations further comprises determining whether any of the two signed input numbers comprise zero values, and skipping the multiply-add operations on numbers determined to comprise zero values.

In Example 15, the subject matter of Examples 12-14 can optionally include wherein the instructions, when executed further cause the at least one processor to shift, based on a determined clock stage, outputs resulting from performing multiplication during the multiply-add operations. In Example 16, the subject matter of Examples 12-15 can optionally include wherein the instructions, when executed further cause the at least one processor to apply an activation function in the machine learning model; and re-encode output activations represented in the first precision format into two numbers of the second precision format; wherein reducing computing on zero values is in response to the predicted sparsity of most significant bits of the plurality of signed input numbers satisfying a determined threshold.

Example 17 is a method for facilitating accelerating neural networks with low precision-based multiplication and exploiting sparsity in higher order bits. The method of Example 17 can include receiving a first signed input number of a plurality of signed input numbers represented in a first precision format, the plurality of signed input numbers associated with a machine learning model; and executing the machine learning model by: re-encoding the first signed input number into two signed input numbers of a second precision format, wherein the first precision format is a higher precision format than the second precision format; performing multiply-add operations in the first precision format using the two signed input numbers of the second precision format; and reducing computing on zero values during the multiply-add operations based on a predicted sparsity of the plurality of signed input numbers.

In Example 18, the subject matter of Example 17 can optionally include wherein the plurality of signed input numbers comprises at least one of weighting values or activation values of the machine learning model. In Example 19, the subject matter of any one of Examples 17-18 can optionally include the method further comprising reducing computing on zero values during the multiply-add operations further comprises determining whether any of the two signed input numbers comprise zero values, and skipping the multiply-add operations on numbers determined to comprise zero values.

In Example 20, the subject matter of any one of Examples 17-19 can optionally include the method further comprising shifting, based on a determined clock stage, outputs resulting from performing multiplication during the multiply-add operations. In Example 21, the subject matter of any one of Examples 17-20 can optionally include the method further comprising: applying an activation function in the machine learning model; and re-encoding output activations represented in the first precision format into two numbers of the second precision format; wherein reducing computing on zero values is in response to the predicted sparsity of most significant bits of the plurality of signed inputs numbers satisfying a determined threshold.

Example 22 is a system for facilitating accelerating neural networks with low precision-based multiplication and exploiting sparsity in higher order bits. The system of Example 22 can optionally include a model parameter memory to store signed input numbers represented in a first precision format as part of a machine learning model; and a processor communicably coupled to the model parameter memory. The processor of the system of Example 22 can comprise a model executor to execute the machine learning model using: a re-encoder to re-encode a first input number of the signed input numbers into two signed input numbers of a second precision format, wherein the first precision format is a higher precision format than the second precision format; a multiply-add circuit to perform operations in the first precision format using the two signed input numbers of the second precision format; and a sparsity hardware circuit to reduce computing on zero values at the multiply-add circuit.

In Example 23, the subject matter of Example 22 can optionally include wherein the signed input numbers comprise at least one of weighting values or activation values of the machine learning model. In Example 24, the subject matter of Examples 22-23 can optionally include wherein the sparsity hardware circuit comprises a finite state machine (FSM) to determine whether any of the two signed input numbers comprise zero values and to cause the multiply-add circuit to skip the operations on numbers comprising zero values. In Example 25, the subject matter of Examples 22-24 can optionally include wherein the model executor further comprises shift logic to shift outputs of a multiplier of the multiply-add circuit based on a determined clock stage.

Example 26 is an apparatus for facilitating accelerating neural networks with low precision-based multiplication and exploiting sparsity in higher order bits according to implementations of the disclosure. The apparatus of Example 26 can comprise means for receiving a first signed input number of a plurality of signed input numbers represented in a first precision format, the plurality of signed input numbers associated with a machine learning model; and means for executing the machine learning model by utilizing: means for re-encoding the first signed input number into two signed input numbers of a second precision format, wherein the first precision format is a higher precision format than the second precision format; means for performing multiply-add operations in the first precision format using the two signed input numbers of the second precision format; and means for reducing computing on zero values during the multiply-add operations based on a predicted sparsity of the plurality of signed input numbers.

In Example 27, the subject matter of Example 26 can optionally include the apparatus further configured to perform the method of any one of the Examples 17 to 20.

Example 28 is at least one machine readable medium comprising a plurality of instructions that in response to being executed on a computing device, cause the computing device to carry out a method according to any one of Examples 16-20. Example 29 is an apparatus for facilitating accelerating neural networks with low precision-based multiplication and exploiting sparsity in higher order bits, configured to perform the method of any one of Examples 16-20. Example 30 is an apparatus for facilitating accelerating neural networks with low precision-based multiplication and exploiting sparsity in higher order bits comprising means for performing the method of any one of claims 16 to 20. Specifics in the Examples may be used anywhere in one or more embodiments.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:
    a processor comprising:
        a re-encoder to re-encode a first input number of signed input numbers represented in a first precision format as part of a machine learning model, the first input number re-encoded into two signed input numbers of a second precision format, wherein the first precision format is a higher precision format than the second precision format;
        a multiply-add circuit to perform operations in the first precision format using the two signed input numbers of the second precision format; and
        a sparsity hardware circuit to reduce computing on zero values at the multiply-add circuit, wherein the sparsity hardware circuit comprises a finite state machine (FSM) to determine whether any of the two signed input numbers corresponding to most significant bits (MSBs) comprise zero values and to cause the multiply-add circuit to skip the operations on numbers comprising zero values;
    wherein the processor to execute the machine learning model using the re-encoder, the multiply-add circuit, and the sparsity hardware circuit.

2. The apparatus of claim 1, wherein the signed input numbers comprise at least one of weighting values or activation values of the machine learning model.

3. The apparatus of claim 1, wherein the processor further comprises a special functions unit (SFU) to apply an activation function in the machine learning model, and wherein the re-encoder to re-encode output activations of the SFU represented in the first precision format into two numbers of the second precision format.

4. The apparatus of claim 3, wherein the processor further comprises a compression circuit to compress the re-encoded output activations.

5. The apparatus of claim 2, wherein the processor further comprises a compression circuit to compress the weighting values represented in the second precision format.

6. The apparatus of claim 1, wherein the processor further comprises shift logic to shift outputs of a multiplier of the multiply-add circuit based on a determined clock stage.

7. The apparatus of claim 1, wherein the second precision format is half of a datasize of the first precision format.

8. The apparatus of claim 1, wherein the second precision format is a four bit nibble format and wherein the first precision format is an eight bit integer format.

9. The apparatus of claim 1, wherein the sparsity hardware circuit operates to reduce computing on zero values at the multiply-add circuit in response to a predicted sparsity of the MSBs of the signed input numbers satisfying a determined threshold.

10. The apparatus of claim 1, wherein a compiler that compiles the machine learning model for execution is to implement a graph split to load balance between branches of a kernel, and wherein the compiler is to implement 8 bit by 8 bit kernels as the graph split.

11. At least one non-transitory machine readable storage medium comprising instructions that, when executed, cause at least one processor to at least:
    receive a first signed input value of a plurality of signed input numbers represented in a first precision format, the plurality of signed input numbers associated with a machine learning model; and
    execute the machine learning model by:
        re-encoding the first signed input number into two signed input numbers of a second precision format, wherein the first precision format is a higher precision format than the second precision format;
        performing multiply-add operations in the first precision format using the two signed input numbers of the second precision format; and
        reducing computing on zero values during the multiply-add operations based on a predicted sparsity of the plurality of signed input values, wherein reducing the computing on zero values further comprises implementing a finite state machine (FSM) to determine whether any of the two signed input numbers corresponding to most significant bits (MSBs) comprise zero values and to cause the multiply-add operations to be skipped on numbers comprising zero values.

12. The at least one non-transitory machine readable storage medium of claim 11, wherein the plurality of signed input numbers comprises at least one of weighting values or activation values of the machine learning model.

13. The at least one non-transitory machine readable storage medium of claim 11, wherein the instructions, when executed, cause the at least one processor to shift, based on a determined clock stage, outputs resulting from performing multiplication during the multiply-add operations.

14. The at least one non-transitory machine readable storage medium of claim 11, wherein the instructions, when executed, cause the at least one processor to:

apply an activation function in the machine learning model; and
re-encode output activations represented in the first precision format into two numbers of the second precision format;
wherein reducing computing on zero values is in response to the predicted sparsity of the MSBs of the plurality of signed input numbers satisfying a determined threshold.

15. A method comprising:
receiving a first signed input number of a plurality of signed input numbers represented in a first precision format, the plurality of signed input numbers associated with a machine learning model; and
executing the machine learning model by:
re-encoding the first signed input number into two signed input numbers of a second precision format, wherein the first precision format is a higher precision format than the second precision format;
performing multiply-add operations in the first precision format using the two signed input numbers of the second precision format; and
reducing computing on zero values during the multiply-add operations based on a predicted sparsity of the plurality of signed input numbers, wherein reducing the computing on zero values further comprises implementing a finite state machine (FSM) to determine whether any of the two signed input numbers corresponding to most significant bits (MSBs) comprise zero values and to cause the multiply-add operations to be skipped on numbers comprising zero values.

16. The method of claim 15, wherein the plurality of signed input numbers comprises at least one of weighting values or activation values of the machine learning model.

17. The method of claim 15, further comprising shifting, based on a determined clock stage, outputs resulting from performing multiplication during the multiply-add operations.

18. The method of claim 15, further comprising:
applying an activation function in the machine learning model; and
re-encoding output activations represented in the first precision format into two numbers of the second precision format;
wherein reducing computing on zero values is in response to the predicted sparsity of the MSBs of the plurality of signed inputs numbers satisfying a determined threshold.

19. A system comprising:
a model parameter memory to store signed input numbers represented in a first precision format as part of a machine learning model; and
a processor communicably coupled to the model parameter memory, the processor comprising a model executor to execute the machine learning model using:
a re-encoder to re-encode a first input number of the signed input numbers into two signed input numbers of a second precision format, wherein the first precision format is a higher precision format than the second precision format;
a multiply-add circuit to perform operations in the first precision format using the two signed input numbers of the second precision format; and
a sparsity hardware circuit to reduce computing on zero values at the multiply-add circuit, wherein the sparsity hardware circuit comprises a finite state machine (FSM) to determine whether any of the two signed input numbers corresponding to most significant bits (MSBs) comprise zero values and to cause the multiply-add circuit to skip the operations on numbers comprising zero values.

20. The system of claim 19, wherein the signed input numbers comprise at least one of weighting values or activation values of the machine learning model.

21. The system of claim 19, wherein the model executor further comprises shift logic to shift outputs of a multiplier of the multiply-add circuit based on a determined clock stage.

22. The system of claim 19, wherein the processor further comprises a special functions unit (SFU) to apply an activation function in the machine learning model, and wherein the re-encoder to re-encode output activations of the SFU represented in the first precision format into two numbers of the second precision format.

23. The system of claim 19, wherein the sparsity hardware circuit operates to reduce computing on zero values at the multiply-add circuit in response to a predicted sparsity of the MSBs of the signed input numbers satisfying a determined threshold.

24. The at least one non-transitory machine readable storage medium of claim 11, wherein a compiler that compiles the machine learning model for execution by the processor is to implement a graph split to load balance between branches of a kernel, and wherein the compiler is to implement 8 bit by 8 bit kernels as the graph split.

25. The method of claim 15, wherein a compiler that compiles the machine learning model for execution is to implement a graph split to load balance between branches of a kernel, and wherein the compiler is to implement 8 bit by 8 bit kernels as the graph split.

* * * * *